United States Patent Office 3,214,393
Patented Oct. 26, 1965

3,214,393
CONCRETE MIXTURE CONTAINING EXPANDED POLYSTYRENE AND A HOMOGENIZING AGENT
Robert C. Sefton, Bridgeville, Pa., assignor to Koppers Company, Inc., a corporation of Delaware
No Drawing. Filed Feb. 20, 1963, Ser. No. 260,025
5 Claims. (Cl. 260—2.5)

This invention relates generally to lightweight construction material and more particularly to lightweight concrete.

The use of concrete has increased greatly during the last decade, but for many purposes, the weight of the concrete is a deterrent factor. Ordinary structural concrete, for example, weighs about 150 pounds per cubic foot. The conventional approach for reducing the weight has been to use lightweight aggregates or foamed concrete or combinations of these. The substitution of expanded shale or blast furnace slag for the aggregate ordinarily used in the concrete mix reduces the weight to about 100 pounds per cubic foot; and the substitution of vermiculite or pearlite reduces the weight even more.

There has now been discovered, in accordance with this invention, a concrete that may be made so light in weight that the concrete will float on water. The lightweight characteristic of the novel concrete of this invention opens a wide avenue for uses, for example, as roof slabs, core material for building partitions, ceiling tile, fence posts, telephone poles, floating docks, garden ornaments, and the like.

The novel concrete mix of this invention is comprised of cement, primary aggregate and/or filler, expanded expandable polystyrene, and a homogenizing agent which maintains the concrete mixture homogeneous so that the composition is homogeneous throughout the block before and after curing.

The cement usable in accordance with this invention may be any of the common cements. For example, there may be used the conventional Portland cements, gypsum products (such as plaster of Paris), calcium-aluminate cement, high-alumina-cement, and magnesia cement or combinations thereof. Such cements are readily available from numerous commercial sources. The choice of type of cement is usually governed by the use to be made of the concrete.

The primary aggregate or filler used in this invention may be any of the conventional aggregates or fillers normally used in the manufacture of concrete. For example, there may be used sand, vermiculite, asbestos, pearlite, wood fibers, chips, shavings and dust, excelsior, cork, slag, vermiculite, fiberglass and hemp, jute or bagasse. The choice of aggregate, of course, depends upon the use to be made of the concrete and the availability of materials. For example, wood fiber gives good tensile strength to the concrete and imparts good flexibility to the product.

The expanded styrene polymers are readily made from particles of expandable styrene polymer that are available from several manufacturers. They are usually spherical beads but can be obtained in various shapes, such as, pellets, discs, strands, and the like. Beads are commercially available that have a size to pass through a U.S. Standard 40-mesh screen but remain on a 60-mesh screen. The particles usually have incorporated therein from 3 to 15% of a light hydrocarbon, such as, hexane, which is normally liquid under ambient conditions but which is readily volatilized at an elevated temperature below the melting point of polystyrene. Heating these particles in an unconfined state expands the particles from ten to sixty times their original size. The heat may be provided in conventional ways as by hot air, hot water, infrared radiation, RF heating, and the like. Advantageously, the apparatus and method for expanding the beads described in Hugh Rodman, Jr., U.S. Patent No. 3,023,175 is used, as it enables the bulk density of the expanded particles to be easily controlled.

The expandable particles of styrene polymer have about the same density as that of water. Expandable polystyrene sold under the trademark Dylite, for example, has an actual density of 65.6 pounds per cubic foot and a bulk density of 38 pounds per cubic foot. The expansion changes this density though; and the expanded particles may have a bulk density as low as one pound per cubic foot. The bulk density of the particles can be readily obtained by weighing a volume of 625 cubic centimeters of the particles. Then each 10 grams of the particles represents a bulk density of one pound per cubic foot; for example, if 625 cubic centimeters of particles weigh 10.7 grams, the bulk density is 1.07 pounds per cubic foot.

The expanded particles are free flowing and have a satiny white appearance, and a continuous outer surface. The interior of the particles consists of a multitude of extremely fine closed cells. Expanded particles may have a diameter, for example, of 125 mils and an average cell size of 2–10 mils. The size of the expanded polystyrene particles is not critical, however.

Now the use of plastics for concrete has been suggested heretofore. For example, F. Veatch et al. Patent No. 2,797,201 suggest the use of hollow plastic particles as an aggregate for concrete. While it would seem that expandable styrene polymer particles, when expanded to lightweight particles, would be excellent for use as an aggregate for concrete, the particles have been used little because of the difficulties presented by a number of other characteristics of styrene polymers. The particles are not easily wetted by water and, indeed, are substantially impervious to moisture. The cement itself does not bond to polystyrene. Based on this characteristic, a conventional practice in concrete construction is to use polystyrene as a parting agent so as to keep the concrete from sticking to a form or to an intersection; the polystyrene readily separating from the concrete.

Maintaining the concrete mixture of cement, water, lightweight expanded styrene polymer beads and other aggregates in uniform and homogeneous condition until the concrete sets has been a great problem. The lightweight beads (which may be 1/100 of the density of the rest of the mixture) tend to rise to the surface and to congregate together, thus giving a non-uniform mix. Dr. Gilbert Thiessen, in Patent No. 3,021,291, proposes to overcome the problem by mixing with cellular concrete the virgin beads of expandable styrene polymer (beads which have not been expanded and which have about the same density as water) and thereafter, during a heat-curing process, expand the beads thereby tending to fill the cells or voids which have previously been made in the concrete.

The homogenizing agent helps to disperse the expandable styrene polymer particles uniformly throughout the mix, maintains the dispersion uniform and provides for the bonding of the styrene particles with the cement. The homogenizing agent, therefore, provides for the expandable polystyrene beads to be suspended evenly in a mixture of wet cement and for various types of aggregates and filters to be used to produce finished products having widely varying characteristics.

The homogenizing agent is comprised of the alkali metal salt of the aliphatic insoluble portion of the aromatic extract of resinous wood, polyvinyl alcohol, and a bitumen.

The alkali metal salt of the aromatic extract of pinewood that is soluble in aromatic but insoluble in aliphatic solvents has been used heretofore in concrete. Primarily, the use has been to provide for air entrainment in the concrete. In accordance with this invention, the sodium salt of the resin is handled in the form of dry powder. The resin itself is a hard, brittle, dark-colored thermoplastic resin.

The resin is produced by extracting pinewood with a hydrocarbon solvent such as benzene to form a preliminary extract; evaporating the solvent from the extract to obtain a mixture of turpentine, pine oil, rosin, and the resin; and then distilling the turpentine and the pine oil from the mixture. The remaining residue is extracted with a preferential aliphatic solvent, for example, petroleum ether or gasoline, to remove the rosin, the dark-colored resinous substance that remains free from the excess solvent. The resin can be saponified with an alkali metal hydroxide by treatment with potassium hydroxide, for example, to produce a salt of the resin. These resins are commercially available, for example, under the trademark Vinsol NVX.

Polyvinyl alcohol is commercially available as white powder or granules and in various viscosity grades. It has been found advantageous, in accordance with this invention, to use the high viscosity grade of polyvinyl alcohol.

The bituminous material usable in accordance with this invention may be any of the low softening point materials derived from asphalt or coal tar. The bituminous material should be liquid at the temperature at which the homogenizing agent mixture is made. This may be accomplished in the case of higher softening point bituminous materials by the use of a small amount of solvent. A particularly excellent bituminous material for use in this invention is sold under the trademark Transphalt. The material is dark, thermoplastic resin composed of a polymeric mixture of polynuclear aromatic hydrocarbons. The hydrocarbons have a very high carbon-to-hydrogen ratio which imparts waterproof characteristics to the resin, as well as alkali and acid resistance.

Advantageously, the agent is made by mixing equal parts of the bituminous material with polyvinyl alcohol. Thereafter, one-half part of the alkali metal salt of the aliphatic insoluble portion of the aromatic extract of pinewood is added, then 10 to 50 parts of water are added thereto. While there is a rather wide range in which the resulting material is operable, if there be too much bituminous material, it will not emulsify; but if there be not sufficient, then an insufficient attack of the bead by the bituminous material will occur and the beads will be loose, that is, not bonded by the cement. Similarly, there should be sufficient polyvinyl alcohol present to form a good emulsion, but if there be too much polyvinyl alcohol present, a gel will be formed; and if too little polyvinyl alcohol be used, the bituminous material will separate. Advantageously, there is used from 1 to 16 parts of bituminous material per 1 part of polyvinyl alcohol and from 4 to 35 parts of water per 1 part of polyvinyl alcohol. With greater amounts of water, the bituminous material tends to separate; and with less water, the material becomes a thick paste and does not mix readily into the concrete mixture.

The proportion of homogenizing agent to be added to the concrete mixture is readily determined by one skilled in the art and depends in general upon the design of the concrete mix; i.e., upon the quantity and nature of the ingredients. Too much homogenizing agent would tend to give a frothy mix, a mix having excessive slump or a powdery surface characteristic when cured. In general, a desirable proportion by weight will range from 1 part of the above aqueous mix of homogenizing agent per 3 parts of styrene polymer to 8 parts of the homogenizing agent per 1 part of styrene polymer.

Heretofore, when lightweight polymeric particles were mixed with concrete mix, there was a great difficulty in distributing the beads uniformly; and they tended to move in the mix and agglomerate. It has been found, in accordance with this invention, that the beads of polymer remain homogeneously distributed in the concrete mix. Thus, it has been possible, in accordance with this invention, to pour walls of as high as twenty feet with a mixture made in accordance with this invention and have the concrete cure without the beads collecting and agglomerating. It has also been found that, in accordance with this invention, there is a definite interface binding of the beads and the concrete or cement. This interface binding is of such nature that if the solid concrete be sawed, the particles of expanded polymer will be cut through rather than being displaced from the concrete.

The action of the novel homogenizing agent of this invention is quite surprising. Polyvinyl alcohol, of course, is often used in the suspension polymerization of styrene polymers for the reason that it does not react with the polymer and forms a good dispersing agent for the styrene prior to the polymerization and for the polymer particles after the polymerization. But this dispersing action during the polymerization is carried out in a carefully controlled aqueous media and not in a thick, alkaline composition as in a concrete mix. The combination of these ingredients provides a definite interfacial bond between the styrene polymer particle and the cement. The fact of this bonding though is quite surprising as many adhesives have little or no chemical attraction for polystyrene.

Preferably the homogenizing agent is prepared by dispersing the polyvinyl alcohol in the bituminous material and then slowly with agitation adding water thereto. This homogenizing mix is then added to water prior to the cement and aggregate.

As an alternative, the particles of polymer may be coated with the homogenizing agent, and the coated particles added to the concrete mix.

In still another alternative mode of operation, the homogenizing agent may be added to the primary aggregate, that is, to the sand, slag, etc. Then this aggregate is added to the concrete mix.

A still further alternative method is to add the homogenizing agent in an anhydrous condition directly to the dry powdered cement.

In the design of the concrete mixtures, it is, of course, essential that the strength of the mix be balanced against the strength of the aggregate and that the mix also meet the economic condition. It has been found, for example, that if a primary aggregate not be used, the cement apparently becomes too strong for the polymeric particles; and cracking of the resulting structure occurs.

The invention will be illustrated further by the following examples wherein, unless otherwise designated, parts are parts by weight.

*Example I*

The homogenizing agent is prepared by mixing 15 parts coarse powdered polyvinyl alcohol (Elvanol grade 5042) with 30 parts liquid bitumen (Transphalt–100). The mixture takes on the characteristics of a thick grease. After the powder is thoroughly dispersed in the bitumen, 15 parts powdered Vinsol NVS resin is thoroughly blended into the mix. The mix thickens more. This mix is placed under a mixer (Lightnin') and while mixing, 480 parts water are added slowly, until a dispersion is formed. With good agitation, this will take approximately 30 minutes. Advantageously, the dispersion is permitted to age overnight before using. During this aging, the components apparently complete their dispersion in the water, and the viscosity rises. The resulting homogenizing agent is a brown liquid having a viscosity, as determined by a Brookfield viscosimeter at 25° C. of 355 poises.

*Example II*

Formulation: Parts
Water _____ 37½
Homogenizing agent of Example I _____ 1½
Portland cement _____ 75
Granulated slag _____ 51
Expanded polystyrene beads (Dylite) (1 lb./cu. ft. bulk density) _____ 1½

The mixing is advantageously carried out as follows: Place water in a cement mixer and add the homogenizing agent. Mix for about 15 seconds. Add cement while mixer is running, and mix for one minute. Add the slag (primary aggregate) and expanded polystyrene beads together slowly, taking approximately two minutes. After all the ingredients have been added, allow them to mix for approximately two minutes for a total mixing time of approximately 5½ minutes. The mixing time does not appear to be critical except, of course, that good mixing must be obtained. After an initial good mixing, the mixture can be left for 15 or 20 minutes and can be remixed, if desired. It can be poured directly from the mixer into a suitable form.

The resulting concrete cast from the composition is homogeneous in appearance, is light gray, and tends to be friable. It has a density of 21.6 pounds per cubic foot and a compressive strength of 150 pounds per square inch. It has a $k$ factor (guarded hot plate, A.S.T.M. Method C 177–45) of 5.

For comparison purposes, a mix was made using the formulation above except that the expanded polymer particles were omitted. The concrete structure cast from this formulation was dusty and quite friable. It had a density of 92 pounds per cubic foot and a compressive strength of 900 pounds per square inch.

As a further comparison, the above formulation was prepared except that the primary aggregate, the granulated slag, was omitted. The resulting composition cracked upon curing so that only density could be determined. It had a density of 27 pounds per cubic foot.

*Example III*

Formulation: Parts
Water _____ 720
Homogenizing agent of Example I _____ 20
Cement _____ 720
Beads of expanded polystyrene (1 lb./cu. ft. bulk density) _____ 20
No. 3 standard coated vermiculite _____ 118

The formulation is mixed in accordance with the procedure of Example II.

The resulting composition cured to a white slab that had a sparkling, glistening appearance. The slab made an excellent ceiling panel. The density of the panel air-dried was 24.6 pounds per cubic foot, had a compressive strength of 198 pounds per square inch, and a $k$ factor (guarded hot plate, A.S.T.M. Method C 177–45) of 0.70 B.t.u. in./hr./sq. ft./° F. The $k$ factor of the expanded polystyrene beads (by the same method) had been 0.26.

*Example IV*

Formulation: Parts
Water _____ 64
Homogenizing agent of Example I _____ 6
White Portland cement _____ 64
Beads of expanded polystyrene (Dylite) (1 lb./cu. ft. bulk density) _____ 2
No. 1 vermiculite _____ 18

The castings which have been made with vermiculite of the smaller size are more easily sawed than the castings made with the vermiculite particles of large size.

*Example V*

Formulation: Parts
Water _____ 440
Homogenizing agent of Example I _____ 40
Cement _____ 80
Johns Manville ¼" chopped fiberglass _____ 1
Beads expanded polystyrene (1 lb./cu. ft. bulk density) _____ 1

The mixing procedure of Example II was carried out with this formulation. The resulting concrete mix was cast into blocks 4 inches x 4 inches x 8 inches. The castings, when cured, had a dense, close-knit appearance. The characteristics of the castings were hard, friable and had a density of 40 pounds per cubic foot. This composition is particularly good for fire-resisting applications.

It has been found that when fiberglass is used, if the fiberglass particles are too long, mixing will cause the mix to assume the characteristics of a huge ball. With an ordinary concrete mixer, it is of advantage not to have the particles longer than ¼ inch.

*Example VI*

Formulation: Parts
Water _____ 32
Homogenizing agent of Example I _____ 2
Cement _____ 32
Asbestos fiber (7M) _____ 3
Beads of expanded polystyrene (1 lb./cu. ft. bulk density) _____ 2

The mixing procedure of Example II was carried out with this formulation. The resulting mixture was cast into bricks 2 inches x 2 inches x 4 inches. The resulting density of the casting was 40 pounds per cubic foot. The castings have excellent fire qualities. Upon being heated, the styrene polymer melts and diffuses into the pores of the casting and eventually, as the temperature becomes great enough, the polymer breaks down and volatilizes. However, the resulting brick has excellent insulating qualities and will resist higher temperatures.

*Example VII*

Formulation: Parts
Water _____ 32
Homogenizing agent of Example I _____ 1
Cement _____ 8
Pearlite _____ 9
Beads of expanded polystyrene (1 lb./cu. ft. bulk density) _____ 3

This formulation was mixed in accordance with the general procedure of Example II. The resulting cured castings were porous but hard. This composition is particularly good for filling the voids between fixed surfaces.

*Example VIII*

Formulation: Parts
Water _____ 54
Homogenizing agent of Example I _____ 6
Cement _____ 72
Fine wood fiber _____ 3
Beads of expanded polystyrene (1 lb./cu. ft. bulk density) _____ 6

The formulation was mixed in accordance with the procedure of Example I and cast into blocks 4 inches x 4 inches x 8 inches. The castings from this composition were extremely porous. The bricks cast from this composition can be readily impregnated with conventional pressure impregnation techniques whereby the wood absorbs the impregnating agent. For example, the resulting brick has been readily impregnated with pentachlorophenol, as a toxicant for termites, diethyltoluimid as a repellent for insects, with a low melting wax as a water repellent, with urea formaldehyde resin as a base for coating, and the like.

*Example IX*

To 75 parts of Portland cement was added 2 parts of low melting point bituminous material (Transphalt–100) and 1 part of powdered polyvinyl alcohol. After thorough mixing, the mixture can be placed in a moisture-proof container, and kept indefinitely. There was then added to the mixture 37 parts water; and this mixture was thoroughly mixed. Thereafter, there was added 51 parts of granulated slag and 1½ parts of expanded styrene polymer. The resulting composition was cast into blocks 4 inches x 4 inches x 8 inches.

*Example X*

The formation of Example II was followed except that 1½ parts of expanded polystyrene particles were coated by mixing same with 1½ parts of homogenizing agent of Example I. The particles may or may not be allowed to dry as desired. The particles have a visible brown coating thereon. Thereafter, 37½ parts of water were added to a mixer and then 75 parts of Portland cement were added. Mixing was continued for one minute, and 51 parts of granulated slag and the expanded and coated polystyrene particles were added slowly to the mix, this addition taking approximately two minutes; thereafter the mix was continued for 5 minutes and the mix placed in a suitable form and cured. The resulting composition was comparable to the composition of Example II.

*Example XI*

To 51 parts of granulated slag was added 1½ parts of the homogenizing agent of Example I. The slag was thus coated with the agent and permitted to dry, although they may be used wet, if desired; 37½ parts of water were added to a mixer and thereafter 75 parts of Portland cement added. Mixing was continued for 1 minute whereupon the coated slag and 1½ parts of expanded polystyrene particles were added over a period of about 2 minutes. Thereafter, the mixing was continued for 5 minutes. The mixture was then poured into forms as in Example X. The results were comparable to those of Example II.

The term polystyrene as used herein is intended to refer to both homopolymers of styrene and copolymers of styrene. Styrene monomer may, for example, be copolymerized with other monomers such as the conjugated 1,3-dienes, e.g. butadiene, isoprene, etc., alpha, beta-unsaturated monocarboxylic acids and derivatives, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. The copolymers of styrene, however, should contain at least 50% and preferably more than 75 weight percent of styrene. The styrene polymer may be blended with other polymers, e.g., styrene polymer blended with rubbery diene polymers and analogous compositions produced by polymerizing a solution of a rubbery diene polymer dissolved in styrene monomer. The term styrene is also intended to include corresponding polymers and copolymers of closely related homologues, e.g., alpha-methylstyrene, o-, m-, and p-ethylstyrenes, o-, m-, and p-methylstyrenes, 2,4-dimethyl-styrene, etc.

The foregoing has presented a novel concrete composition. The resulting casting is a lightweight concrete composition whose characteristics may be widely varied dependent upon the amount of expanded polymer, the type of concrete, and the type of aggregate used in the composition.

The composition remains homogeneous and has surprising strength, thermo, and esthenic properties. It is, of course, readily apparent that the visual properties of the concrete may be varied by varing the color of the cement by adding conventional pigments to the cement and by dyeing or otherwise coloring the expanded polystyrene particles.

I claim:

1. A concrete mixture comprised of cement, a primary aggregate, expanded styrene polymer, and a homogenizing agent consisting of polyvinyl alcohol, a bituminous compound, and the alkali metal salt of the aliphatic insoluble portion of the aromatic extract of pinewood.

2. In a concrete composition of cement, a primary aggregate, an expanded styrene polymer, and a homogenizing agent comprising a mixture of polyvinyl alcohol, a bituminous compound, and the alkali metal salt of the aliphatic insoluble portion of the aromatic extract of pinewood.

3. An expanded styrene polymer to be used in a concrete mixture containing a primary aggregate, said particle being coated with a homogenizing agent, agent being a mixture of polyvinyl alcohol, a bituminous material, and the alkali metal salt of the aliphatic insoluble portion of the aromatic extract of pinewood.

4. A concrete mixture containing a primary aggregate, an expanded styrene polymer, and a cement, said cement including a homogenizing agent; this is a mixture of polyvinyl alcohol, a bituminous material, and the alkali metal salt of the aliphatic insoluble portion of the aromatic extract of pinewood.

5. A primary aggregate particle to be used in a concrete mixture containing an expanded styrene polymer, said particle being coated with a homogenizing agent comprised of polyvinyl alcohol, a bituminous material, and the alkali metal salt of the aliphatic insoluble portion of the aromatic extract of pinewood.

No references cited.

MURRAY TILLMAN, *Primary Examiner.*